March 19, 1957     O. BOVA     2,785,693
COMB FOR COLORING HAIR
Filed July 26, 1955

*INVENTOR.*
OTTAVIO BOVA
BY

United States Patent Office 2,785,693
Patented Mar. 19, 1957

2,785,693

COMB FOR COLORING HAIR

Ottavio Bova, Brooklyn, N. Y.

Application July 26, 1955, Serial No. 524,376

2 Claims. (Cl. 132—163)

This invention relates to a comb for coloring hair.

It is an objective of this invention to provide a comb adapted to frictionally dispense coloring matter upon combing.

It is another objective to provide a consumable comb of inexpensive construction.

These and other objectives of this invention will become apparent upon reading the following descriptive disclosure taken in conjunction with the drawing in which.

Figure 1:
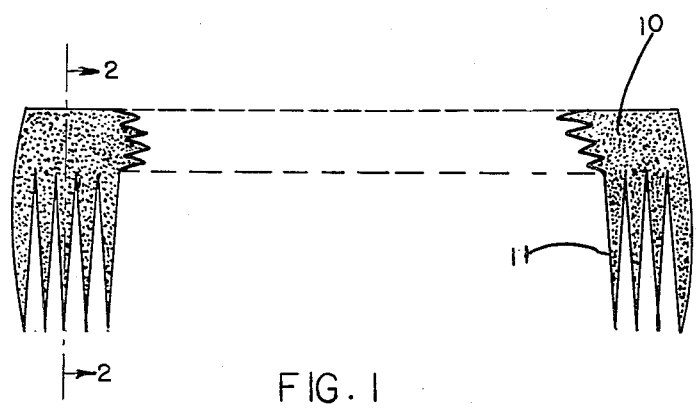
Fig. 1 is a plane elevation of a conventionally shaped pocket comb.
Figure 2:
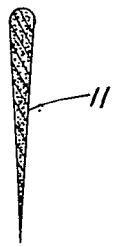
Fig. 2 is a transverse section taken on line 2—2 of Fig. 1.

Many individuals desire to color their hair for example to conceal gray hair or to color gray hair black, brunette, blond, etc. This is particularly the situation with the women.

Modern hair dyeing or color is a tedious and often a messy procedure.

Moreover, after the hair is dyed it must be continuously "touched up" to conceal the color of the new growth.

The comb of this invention easily colors the hair and is convenient for touching up purposes.

Turning to the drawing the entire comb 10 including its teeth 11 is adapted to yield color upon use as a comb.

The comb may be made entirely of a single pigment, or mixture of pigments or pigments with diluent filters. The comb made be made of compressed pigments, compressing relatively lightly, so that the combing of hair will effect frictional loss of pigment from the comb with transfer of the frictionally rubbed away pigment to the hair wall.

Thus carbon black pigment may be used for the comb, alone or compounded with an adhesive such as stearic acid to assist the adhesion of the carbon particles.

Where a red or brunette color is desired red ochre, burnt sienna, Tuscan red, etc. may be used as the pigment. Where a blond color is desired the pigment may be golden ochre, yellow ochre, chrome yellow etc.

In all cases the color pigment must be transferred to the hair during the combing process thereby consuming the comb teeth. A suitable amount of diluent such as clay, diatomaceous earth, etc. may be employed if desired. The diluent may be as high as 80 to 90 percent of the total comb ingredients where a strong color pigment is employed.

The combs above related are used to comb dry hair.

It is however also within the scope of this invention to provide a comb having water-soluble dyes of suitable colors. Such a comb is made of compressed discrete particles admixed with dye particles for example with Alizarine red where a reddish color is desired. Various dye particles of different colors may be admixed in the comb composition ingredients prior to compressing the mixture in comb form in order to obtain suitable blended colors. For example Alizarin red may be admixed with Auramine yellow.

Where dyes having water solubility are used, the comb is used to comb wet hair thereby combing and dyeing the hair in one operation.

This invention has been illustrated by a means of a plurality of embodiments but other embodiments obvious to those skilled in the art are contemplated to fall within the scope of the claims herein.

I claim:

1. A gradually consumable comb for coloring dry hair by the dry combing thereof consisting essentially of a plurality of compressed dry color pigment particles and a suitable adhesive to adhere said particles to one another to form the configuration of a comb having a plurality of teeth, said particles being compressed suitably to permit release of color pigments upon combing dry hair, whereby the frictional force of combing hair releases the dry pigment particles from the comb teeth.

2. The comb of claim 1 wherein the pigment particles are carbon black and the adhesive is stearic acid.

References Cited in the file of this patent

UNITED STATES PATENTS

| | | |
|---|---|---|
| 1,127,496 | North | Feb. 9, 1915 |
| 2,577,921 | Samel et al. | Dec. 11, 1951 |

FOREIGN PATENTS

| | | |
|---|---|---|
| 42,664 | Germany | Feb. 28, 1888 |